2 Sheets--Sheet 1.

S. BUCK.
Machines for Making Carriage-Wheels

No. 152,457. Patented June 30, 1874.

Witnesses.  Inventor.

S. BUCK.
Machines for Making Carriage-Wheels

No. 152,457. Patented June 30, 1874.

Witnesses.
Wendell R. Curtis
John T. Peters

Inventor.
Silas Buck
by Theo. G. Ellis Attorney

UNITED STATES PATENT OFFICE.

SILAS BUCK, OF HARTFORD, CONNECTICUT.

IMPROVEMENT IN MACHINES FOR MAKING CARRIAGE-WHEELS.

Specification forming part of Letters Patent No. 152,457, dated June 30, 1874; application filed May 4, 1874.

*To all whom it may concern:*

Be it known that I, SILAS BUCK, of Hartford, in the county of Hartford and State of Connecticut, have invented certain new and useful Improvements in Machines for Making Carriage-Wheels; and I do hereby declare that the following is a full, clear, and exact description thereof, whereby a person skilled in the art can make and use the same, reference being had to the accompanying drawings and to the letters of reference marked thereon.

Like letters in the figures indicate the same parts.

The object of my invention is to make the wheels of carriages, more especially those of small size for children's carriages, in a more rapid and expeditious manner than is at present used. My invention consists in a combination and arrangement of devices whereby the operations upon each spoke of the wheel, such as boring the hub, sawing off the end of the spoke to a given length after it is inserted, and forming the tenon upon the end for the reception of the felly, are all performed simultaneously.

Figure 1:
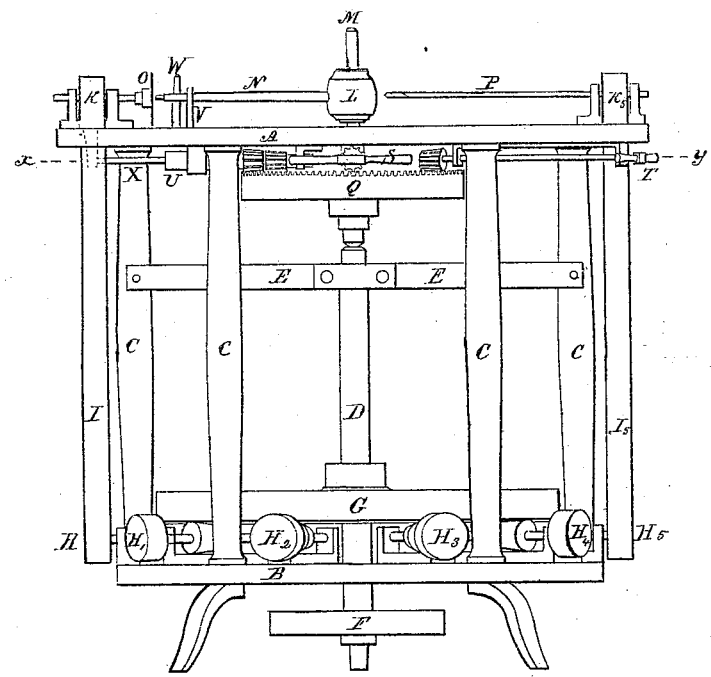
Figure 2:
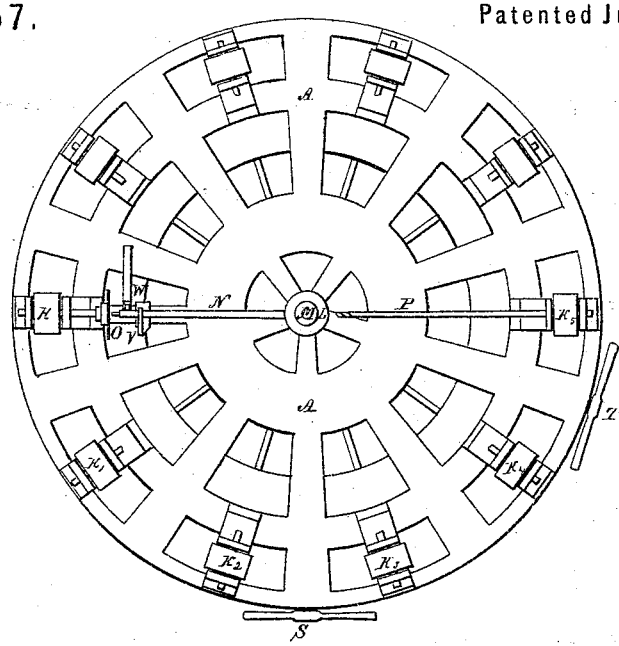
Figure 3:
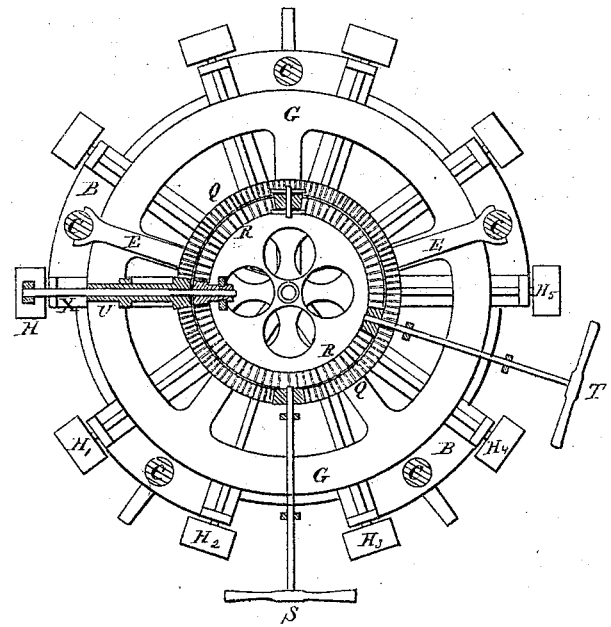

In the accompanying drawings, Figure 1 is a front view of my improved machine. Fig. 2 is a top view of the same. Fig. 3 is a top view of a section, upon the line $x\,y$, and the parts below, the top plate being removed.

A is the top plate of the machine. B is the bottom plate. These two plates are connected together by the posts C C, &c., and form a rigid frame-work. D is a spindle moving in journals in the plate B and the bar E, this latter being firmly attached to the posts C, and forming part of the fixed frame. The spindle D is driven by the pulley F, which is usually situated below the floor on which the machine rests. Upon D is the horizontal wheel G. This wheel acts, by its weight, upon friction-pulleys to drive the belt-pulleys H $H_1$ $H_2$, &c., as shown in Figs. 1 and 3 of the drawings. Directly above the pulleys H $H_1$, &c., are the pulleys K $K_1$, &c., which are driven by belts I, &c., passing over both. In Fig. 1, only the pulleys K and $K_5$, with their belts I and $I_5$, are shown, the intermediate pulleys and belts being removed to show the other parts more clearly. The positions of the removed pulleys are shown in Fig. 2. L is the hub of a wheel resting on the spindle M. N is a spoke inserted in the hub L. O is a circular saw fixed to the spindle, which forms the axis of the pulley K. It is for the purpose of sawing off the ends of the spokes. In the center of the saw is a hollow auger for forming the tenon upon the end of the spoke after it is sawed off. This is done by advancing the saw O toward the hub L by means of a mechanism that will be hereinafter explained. P is an auger for boring holes in the hub for the spokes. The saws O and the augers P are applied to all of the pulleys K, &c., and are interchangeable, either all the saws or all the augers being used at the same time. One saw and one auger are shown in Fig. 1 only for the purpose of illustration. The spindle M passes through a bearing in the plate A, and rests in the top of the shaft D. Upon this spindle are two loose gear-wheels, Q and R, which are operated by the handles S and T turning pinions which gear into them, as shown in Figs. 1 and 3. The handle S and outer wheel Q operate a pinion upon the rocking shaft U. To this rocking shaft is attached the hook V for pressing the spoke firmly against the rest W and holding it while being operated upon by the hollow auger for forming the tenon. The handle T and the inner wheel R operate a pinion, which forms a nut upon the end of the bar X. This bar is attached to the frame of the pulley K, so that the turning of the pinion upon the screw-thread cut upon the bar causes the pulley-frame to advance or recede from the hub in the center of the machine. The devices described for grasping the spoke while being operated upon, and those for advancing and moving back the pulley K, are applied to each of the pulleys K to $K_5$, &c., all around the frame. They are shown in the drawings as attached to K only for the clearer delineation of the parts. The spokes are all clamped simultaneously by turning the handle S, and the hollow augers are all advanced simultaneously by turning the handle T.

The operation of my improved machine is as follows: When it is desired to bore the holes for the insertion of the spokes in the hub, the augers P are placed in all the pulleys K, and the hub is placed upon the central pin M. The handle T is now turned, which advances all the augers and bores the holes. The augers are then withdrawn by turning T in the opposite direction, and another hub placed upon the spindle M. When the hub is small, and the augers would interfere with each other near the center, the boring can be done in two operations, using half the number of augers each time. When it is desired to finish the ends of the spokes of a wheel, the augers are removed and replaced by the saws and hollow augers O. The wheel is placed upon the machine by passing M through the hub, and turned so as to bring the spokes against the edges of the saws. This cuts them all off at once to the proper length. The handle S is then turned, which clamps all the spokes opposite the hollow augers. These latter are then advanced by turning the handle T. When the tenons are cut as far as desired, the augers are withdrawn by turning T back. The spokes are released by turning the handle S back, and the wheel is removed.

What I claim as my invention is—

1. The combination of the devices S Q with the several devices U, V, and W at each pulley K, for holding the spokes while forming the tenons upon their ends, substantially as herein described.

2. The combination of the devices T R with the several devices X, and the connecting parts for advancing and withdrawing the pulleys K, substantially as herein described.

3. The combination of a number of radially-moving pulleys, K K, &c., provided with saws and hollow augers O, with a plate upon which they are arranged in a circular manner, for the purpose of cutting off and forming tenons upon all the spokes of a wheel simultaneously, substantially as herein described.

SILAS BUCK.

Witnesses:
   THEO. G. ELLIS,
   WENDELL R. CURTIS.